(12) United States Patent
Ito et al.

(10) Patent No.: US 8,641,482 B2
(45) Date of Patent: Feb. 4, 2014

(54) GEAR GRINDING TOOL

(75) Inventors: Tatsuya Ito, Utsunomiya (JP); Naoki Iwasa, Tochigi-ken (JP); Hiroshi Ogawa, Tochigi-ken (JP); Keisuke Takahashi, Tochigi-ken (JP); Yuichi Tomizawa, Sakura (JP); Yasutaka Matsuo, Tochigi-ken (JP); Masahiro Izumida, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 620 days.

(21) Appl. No.: 12/892,552

(22) Filed: Sep. 28, 2010

(65) Prior Publication Data

US 2011/0076926 A1    Mar. 31, 2011

(30) Foreign Application Priority Data

Sep. 29, 2009 (JP) ................................. 2009-223952

(51) Int. Cl.
*B23F 21/02* (2006.01)
*B24B 1/00* (2006.01)

(52) U.S. Cl.
USPC .............................. 451/547; 451/47; 451/253

(58) Field of Classification Search
USPC ......... 451/47, 48, 57, 58, 147, 219, 253, 250, 451/547
See application file for complete search history.

(56) References Cited

U.S. PATENT DOCUMENTS

| 2,607,175 | A  | * | 8/1952  | Osplack ......................... 451/47 |
| 8,277,285 | B2 | * | 10/2012 | Baldeck et al. ................. 451/47 |
| 2005/0239385 | A1 | | 10/2005 | Jankowski et al. |
| 2007/0275638 | A1 | * | 11/2007 | Baldeck et al. ................. 451/11 |

FOREIGN PATENT DOCUMENTS

| JP | 60-161024 A | 8/1985 |
| JP | 2005-305645 A | 11/2005 |

* cited by examiner

*Primary Examiner* — Timothy V Eley
(74) *Attorney, Agent, or Firm* — Arent Fox LLP (57) ABSTRACT

A gear grinding tool, which includes a helical tooth with grinding faces on surfaces thereof, grinds tooth faces of a gear as a workpiece with the grinding faces. The grinding face includes a rough grinding face for performing a rough grinding process. The grinding face includes a rough grinding face for performing a rough grinding process, and the rough grinding face includes a forming line for performing a finishing process.

2 Claims, 9 Drawing Sheets

GEAR GRINDING TOOL

CROSS-REFERENCE TO RELATED APPLICATION

This application is based upon and claims the benefit of priority from Japanese Patent Application No. 2009-223952 filed on Sep. 29, 2009, of which the contents are incorporated herein by reference.

BACKGROUND OF THE INVENTION

1. Field of the Invention

The present invention relates to a gear grinding tool having a helical tooth that meshes with a rotating gear to grind the gear. The present invention also concerns a method of using such a gear grinding tool.

2. Description of the Related Art

Generally, gear grinders include a tool shaft, which holds a gear grinding tool having a helical tooth and a workpiece shaft that holds a gear, which serves as a workpiece. During operation, the tool shaft and the workpiece shaft rotate in synchronism with each other in order to grind the tooth faces with the gear grinding tool.

Such tooth faces often are ground separately in two stages, i.e., a rough grinding stage and a finishing stage. The rough grinding stage and the finishing stage make use of a rough grinding tool and a finishing tool, respectively, to successively perform corresponding grinding processes on the tooth faces in order to grind the tooth faces to a desired finish level.

Japanese Laid-Open Patent Publication No. 2005-305645 discloses a gear grinding tool having a rough grinding region and a finishing region, which are arrayed along an axial direction of the gear grinding tool, and which overlap each other along the axial direction.

The gear grinding tool disclosed in Japanese Laid-Open Patent Publication No. 2005-305645 is capable by itself of successively performing a rough grinding process and a finishing process. However, the disclosed gear grinding tool is disadvantageous in that the service life of the finishing area thereof may end earlier than the service life of the rough grinding region. Thus, because the finishing region has a grinding surface that is finer than the rough grinding region and tends to become worn and rendered unusable sooner than the rough grinding region, the gear grinding tool could possibly fail to achieve a desired level of machining accuracy. Further, once the finishing area becomes worn out, the rough grinding region, which actually is still capable of being used, is rendered useless, with the result that the service life of the gear grinding tool as a whole is shortened.

SUMMARY OF THE INVENTION

It is an object of the present invention to provide a gear grinding tool, which is capable by itself of successively performing a rough grinding process and a finishing process, and whereby the service life of the gear grinding tool can be lengthened. The present invention also concerns a method of using such a gear grinding tool.

According to the present invention, there is provided a gear grinding tool having a helical tooth that meshes with a rotating gear to grind the gear, comprising a grinding face for performing a rough grinding process on the gear, the grinding face extending on and along the helical tooth, and a forming line for performing a finishing process on the gear, the forming line extending on at least a portion of the grinding face.

With the above arrangement, since the forming line extends on at least a portion of the grinding face, the gear grinding tool can carry out by itself both the rough grinding process and the finishing process, and hence, the gear grinding tool is simple in structure and low in cost. Because the forming line is generated on the grinding face, even if a portion of the forming line becomes excessively worn and is rendered unusable, the grinding surface, which is disposed adjacent to the forming line, may still be used for the rough grinding process, whereas a forming line, which has not yet been rendered unusable, may be used for the finishing process. Thus, the service life of the gear grinding tool can be increased.

If the forming line is shaped as a web on the grinding face, then the forming line can be generated with ease, and the gear grinding tool can be made low in cost.

The gear grinding tool may have an overall length that is equal to or more than twice the length of a portion thereof that is used for the finishing process, along an axial direction of the gear grinding tool. In such a case, the gear grinding tool may be divided in a well balanced fashion into regions, which are used for carrying out the rough grinding process and the finishing process. When the forming line in one of the regions becomes excessively worn and is rendered unusable, the grinding face including the unusable forming line may still be used for the rough grinding process, whereas a new forming line may be generated on the grinding face in another one of the regions and used for the finishing process. Consequently, the service life of the gear grinding tool can be increased.

When the helical tooth, including the forming line on the grinding face thereof, is viewed along an axis of the gear grinding tool, the forming line may be curved such that the radial position thereof on the grinding face varies gradually with respect to the axial center of the helical tooth. Thus, the forming line may reliably be brought into contact with tooth faces of the gear, and the grinding face adjacent to the forming line may also reliably be brought into contact with tooth faces of the gear.

According to the present invention, there also is provided a method of using a gear grinding tool including a grinding face for performing a rough grinding process on a gear, the grinding face extending on and along a helical tooth of the gear grinding tool, and a forming line for performing a finishing process on the gear, the forming line extending on at least a portion of the grinding face. The method comprises the steps of carrying out a first mode of usage for performing the rough grinding process on the gear with the grinding face, and thereafter performing the finishing process on the gear with the forming line, and carrying out a second mode of usage for performing the rough grinding process on the gear with the grinding face juxtaposed with respect to the forming line, which has been rendered unusable by the finishing process in the first mode of usage, or with an unused grinding face, and thereafter performing the finishing process on the gear with another forming line other than the forming line used in the first mode of usage.

With the above method, the gear grinding tool may includes regions for performing the rough grinding process and the finishing process, and such regions can be used separately to increase the service life of the gear grinding tool.

During the second mode of usage, a new forming line may be generated on a grinding face that has been used during the first mode of usage, or on an unused grinding face, whereupon the finishing process may be performed on the gear using the new forming line. Since a forming line may be generated on the grinding face to be used during the second mode of usage without generating a forming line on the grinding face that is used during the first mode of usage, in this manner, the gear grinding tool and the gear can easily be positioned in meshing engagement with each other for carrying out the first mode of usage, and a forming line that is not used for the rough grinding process can be prevented from becoming unduly worn.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Gear grinding tools according to preferred embodiments of the present invention shall be described in detail below with reference to the accompanying drawings, in relation to a method of using the gear grinding tools.

Figure 1:
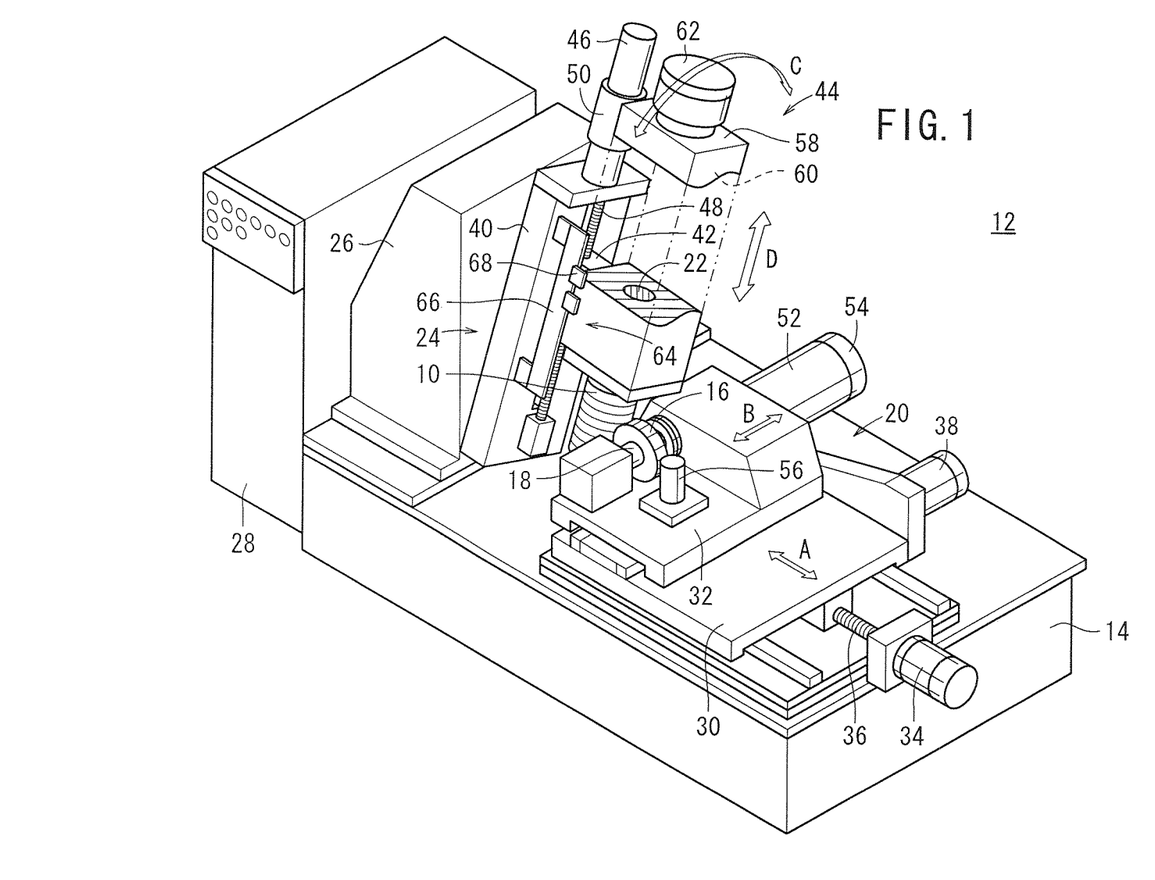
FIG. 1 is a perspective view of a gear grinder, which incorporates therein a gear grinding tool according to an embodiment of the present invention.
Figure 2:
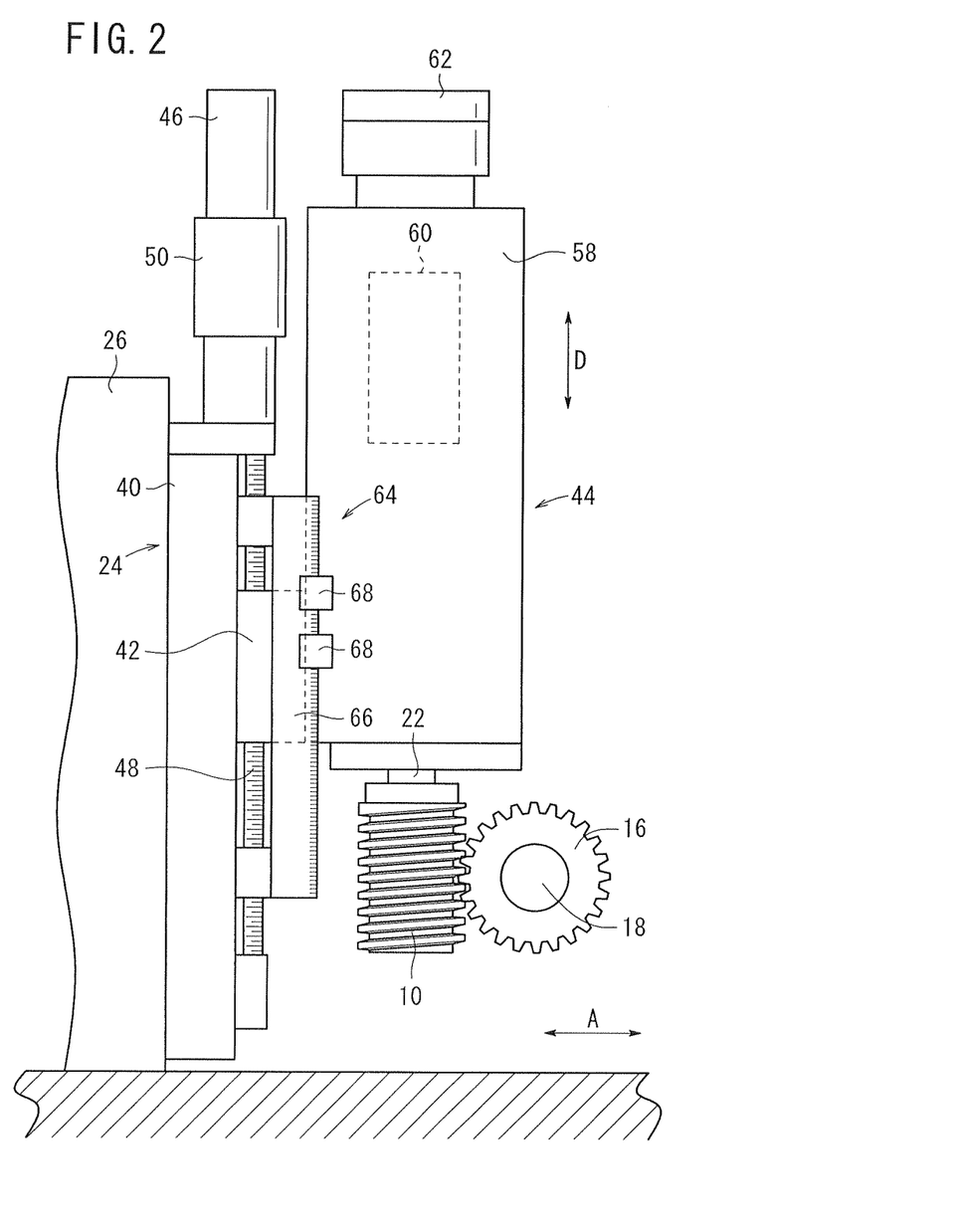
FIG. 2 is a fragmentary front elevational view of a tool shaft and proximate parts of the gear grinder shown in FIG. 1.

FIG. 1 is a perspective view of a gear grinder 12, which incorporates therein a gear grinding tool 10 according to an embodiment of the present invention. FIG. 2 is a fragmentary front elevational view of a tool shaft and proximate parts of the gear grinder 12 shown in FIG. 1. The gear grinding tool 10 makes up a tool that is mounted on a tool shaft of the gear grinder 12, for thereby grinding tooth faces of a gear that is mounted on a workpiece shaft of the gear grinder 12.

As shown in FIGS. 1 and 2, the gear grinder 12 comprises a bed 14, a workpiece shaft 18 for holding over the bed 14 a gear 16 to be ground as a workpiece, a movable table mechanism 20 for supporting the workpiece shaft 18 thereon, the workpiece shaft 18 being movable over the bed 14 in cutting directions indicated by the arrow A and in traverse directions indicated by the arrow B, a tool shaft 22 for holding the gear grinding tool 10 in facing relation to the workpiece shaft 18 over the bed 14, a column 26 that supports a slider mechanism 24 for supporting the tool shaft 22 thereon, the tool shaft 22 being movable over the bed 14 in turning directions indicated by the arrow C and in axial directions indicated by the arrow D, and a control console 28, which is disposed behind the column 26 at a position remote from the slider mechanism 24.

The movable table mechanism 20 comprises an advancing table 30 movably supported on the bed 14 for movement in directions indicated by the arrow A, and a traverse table 32 movably supported on the advancing table 30 for movement in directions indicated by the arrow B. The workpiece shaft 18 is disposed on the traverse table 32. The advancing table 30 is movable in directions indicated by the arrow A by a cutting motor 34 and a ball screw mechanism 36. The traverse table 32 is movable in directions indicated by the arrow B by a traverse motor 38 and a ball screw mechanism, not shown.

The slider mechanism 24 comprises a turntable 40 swingably supported on a side of the column 26, which is erected on the bed 14 for swinging movement in directions indicated by the arrow C, and a shift table 42 movably supported on the turntable 40 for movement in directions indicated by the arrow D. The shift table 42 supports thereon the tool shaft 22, and a spindle unit 44 for rotating the tool shaft 22. The turntable 40 can be turned with respect to the shift table 42 by a motor, not shown, in the directions indicated by the arrow C. The shift table 42 can be moved in the directions indicated by the arrow D by a shift motor 46 and a ball screw mechanism 48, with a speed reducer 50 interposed therebetween.

The workpiece shaft 18 can be rotated about its own axis by a workpiece shaft motor 52, which is mounted on the traverse table 32, for rotating the gear 16 at a certain rotational speed. An encoder 54 detects rotation of the workpiece shaft motor 52, and a workpiece sensor 56 detects rotation of the gear 16. A transmitting mechanism, not shown, including a speed reducer, etc., is interposed between the workpiece shaft motor 52 and the workpiece shaft 18. The workpiece sensor 56 magnetically or optically detects the number of teeth of the gear 16 as the gear 16 rotates, and generates pulses representative of the detected number of teeth.

The tool shaft 22 can be rotated on the shift table 42 by the spindle unit 44. The spindle unit 44 comprises a spindle motor 60 housed in a housing 58, and an encoder 62 for detecting rotation of the spindle motor 60. A transmitting mechanism, not shown, including a speed reducer, etc., is interposed between the spindle motor 60 and the tool shaft 22.

The gear grinder 12 also includes a position detector 64 for detecting the position of the shift table 42, i.e., the position of the tool shaft 22 (spindle unit 44) with respect to the directions indicated by the arrow D. The position detector 64 comprises a linear scale 66 attached to the turntable 40 and having graduations, and a pair of spaced sensors 68 attached to the shift table 42 (the spindle unit 44) and movable in unison with the shift table 42 for detecting the graduations of the linear scale 66. The position detector 64 is capable of directly detecting the position of the tool shaft 22 (the gear grinding tool 10) with respect to the directions indicated by the arrow D, for thereby allowing movement of the tool shaft 22 to be controlled with high accuracy. Although, as shown in FIGS. 1 and 2, the position detector 64 includes the paired sensors 68, which are spaced apart from each other along the graduations, the position detector 64 may instead include a single sensor 68.

The control console 28 serves as a controller for controlling the gear grinder 12 in its entirety under a predetermined NC (Numerical Control) program. More specifically, the control console 28 performs a feedback control process based on detected signals from the encoders 54, 62, the workpiece sensor 56, and the position detector 64, for thereby positionally controlling the workpiece shaft 18 and the tool shaft 22 in order to position the gear grinding tool 10 and the gear 16 into an initial meshing state with each other, and to synchronize the gear grinding tool 10 and the gear 16 to undergo rotation at a time when the gear grinding tool 10 grinds the gear 16.

Figure 3:
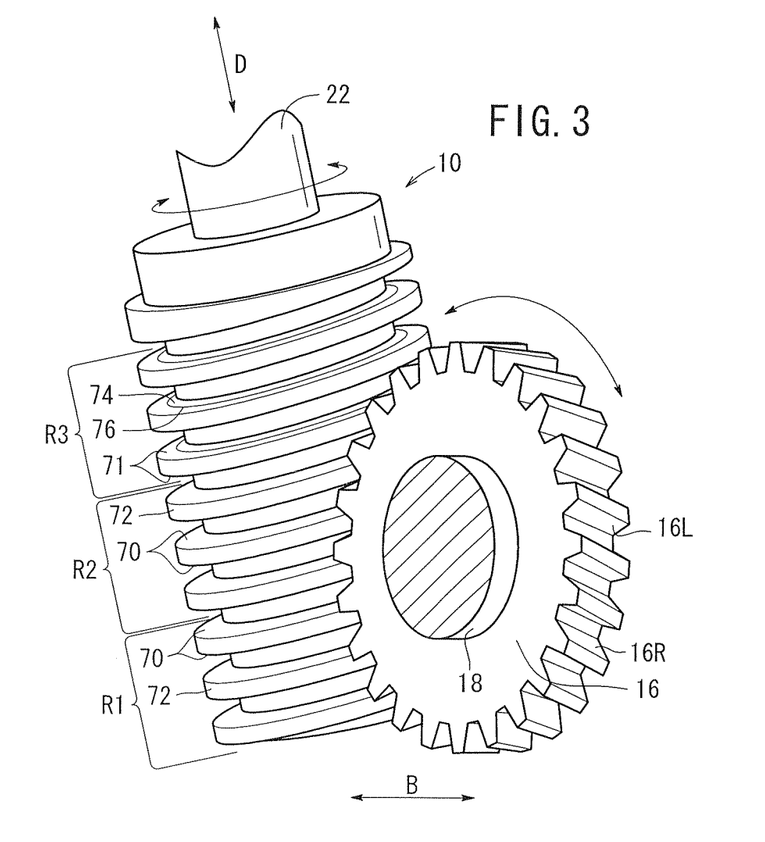
FIG. 3 is a fragmentary perspective view of the gear grinding tool, which is held in mesh with a gear.

As shown in FIG. 3, the gear grinding tool 10 comprises a helical grinding wheel for grinding tooth faces 16R, 16L of the gear 16, which comprises a helical gear, for example. The gear grinding tool 10 includes a helical tooth 72 having grinding faces 70, 71 on outer circumferential surfaces thereof for performing dual tooth face grinding on the tooth faces 16R, 16L of the gear 16. The gear grinding tool 10 is controlled by the control console 28 so as to rotate while the helical tooth 72 is held in mesh with the gear 16, for thereby grinding the tooth faces 16R, 16L with the grinding faces 70, 71. In FIG. 3, the helical tooth 72 has grinding faces 70, 71 on upper and lower surfaces thereof for carrying out dual tooth face grinding. However, depending on grinding conditions and the type of the gear 16, the helical tooth 72 may have only one grinding face 70 provided on one of the upper and lower surfaces thereof.

In the illustrated embodiment shown in FIG. 3, the helical tooth 72 includes nine turns as viewed in front elevation. Among the nine turns, the lower three turns, which have the grinding faces 70, will be referred to as a region R1, the middle three turns, which have the grinding faces 70, will be referred to as a region R2, and the upper three turns, which have the grinding faces 71, will be referred to as a region R3. In other words, the regions R1, R2 have the grinding faces 70, whereas the region R3 has the grinding faces 71. The number of turns of the helical tooth 72, and the manner in which the turns thereof are divided into respective regions, may be varied depending on the grinding conditions and on the specifications of the gear 16.

Figure 4A:
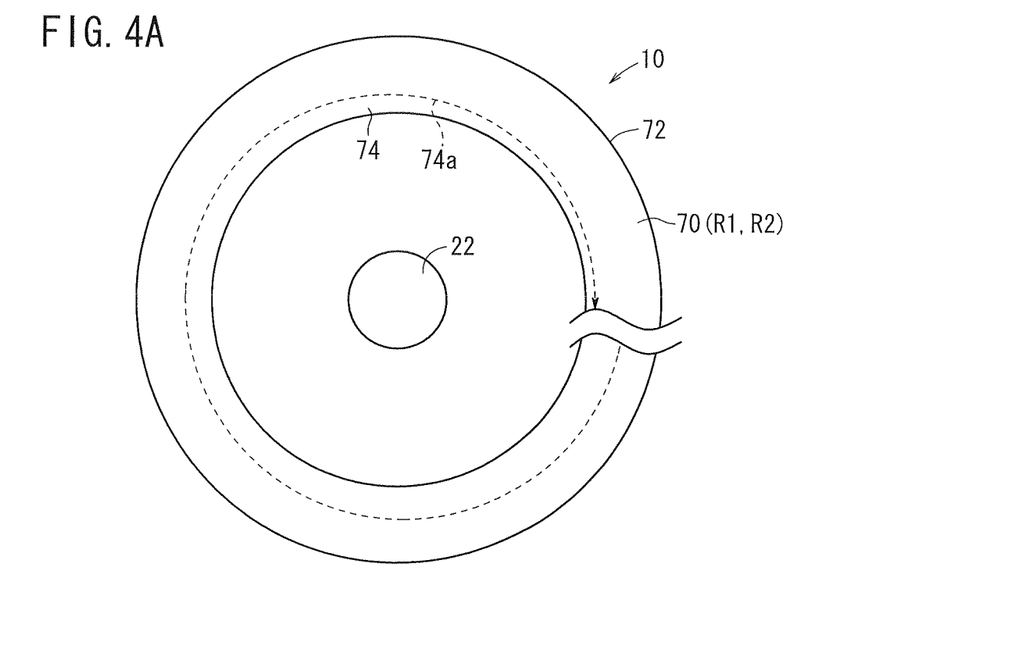
FIG. 4A is a plan view schematically showing a grinding face of the gear grinding tool, which does not have a forming line thereon.
Figure 4B:
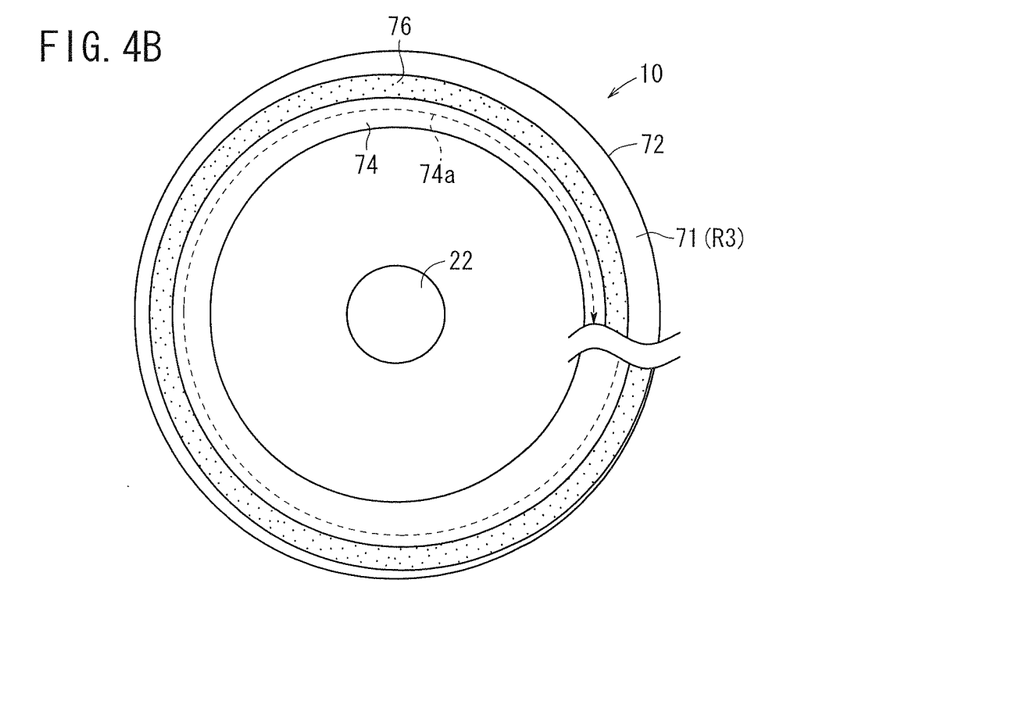
FIG. 4B is a plan view schematically showing a grinding face of the gear grinding tool, which includes a forming line thereon.

FIG. 4A is a plan view showing schematically the grinding face 70 in the regions R1, R2 of the gear grinding tool 10. FIG. 4B is a plan view showing schematically the grinding face 71 in the region R3 of the gear grinding tool 10.

As shown in FIG. 4A, the grinding face 70 in the regions R1, R2 includes a rough grinding face 74 for performing a rough grinding process, disposed substantially over the entire surface (either on both the upper and lower surfaces thereof, or on one of the upper and lower surfaces) of the helical tooth 72. As shown in FIG. 4B, the grinding face 71 in the region R3 includes a rough grinding face 74 for performing a rough grinding process, disposed substantially over the entire surface (either on both the upper and lower surfaces thereof, or on one of the upper and lower surfaces) of the helical tooth 72, and also a forming line (finishing grinding face) 76 for performing a finishing process along the direction in which the rough grinding face 74 performs the rough grinding process, i.e., along the direction in which the helical tooth 72 extends. The forming line 76 is in the shape of a web having a prescribed width. Although the rough grinding face 74 extends substantially entirely over each of the grinding faces 70, 71, a portion of the rough grinding face 74, which actually is used to grind the gear 16, may also be in the shape of a web, as is the case with the forming line 76. In FIGS. 4A and 4B, the portion of the rough grinding face 74 that actually is used is illustrated as a grinding line 74a, which is indicated by the broken-line arrow.

On the grinding face 71, the forming line 76 for performing the finishing process serves to grind the gear 16 more finely than the rough grinding face 74. The forming line 76 is prepared on the rough grinding face 74 using a dresser or the like, for scraping off the surface of the rough grinding face 74 in the shape of a web. When the gear grinding tool 10 is in operation, the rough grinding face 74 in the region R1, for example, performs the rough grinding process (primary grinding process) on the tooth face 16R (16L), and thereafter, the forming line 76 in the region R3 performs the finishing process (secondary grinding process) on the tooth face 16R (16L), thereby producing a desired tooth face profile.

A gear grinding process performed by the gear grinder 12, and which incorporates the gear grinding tool 10 thus constructed, will be described below with reference to the flowchart shown in FIG. 5, along with a method of using the gear grinding tool 10.

Figure 5:
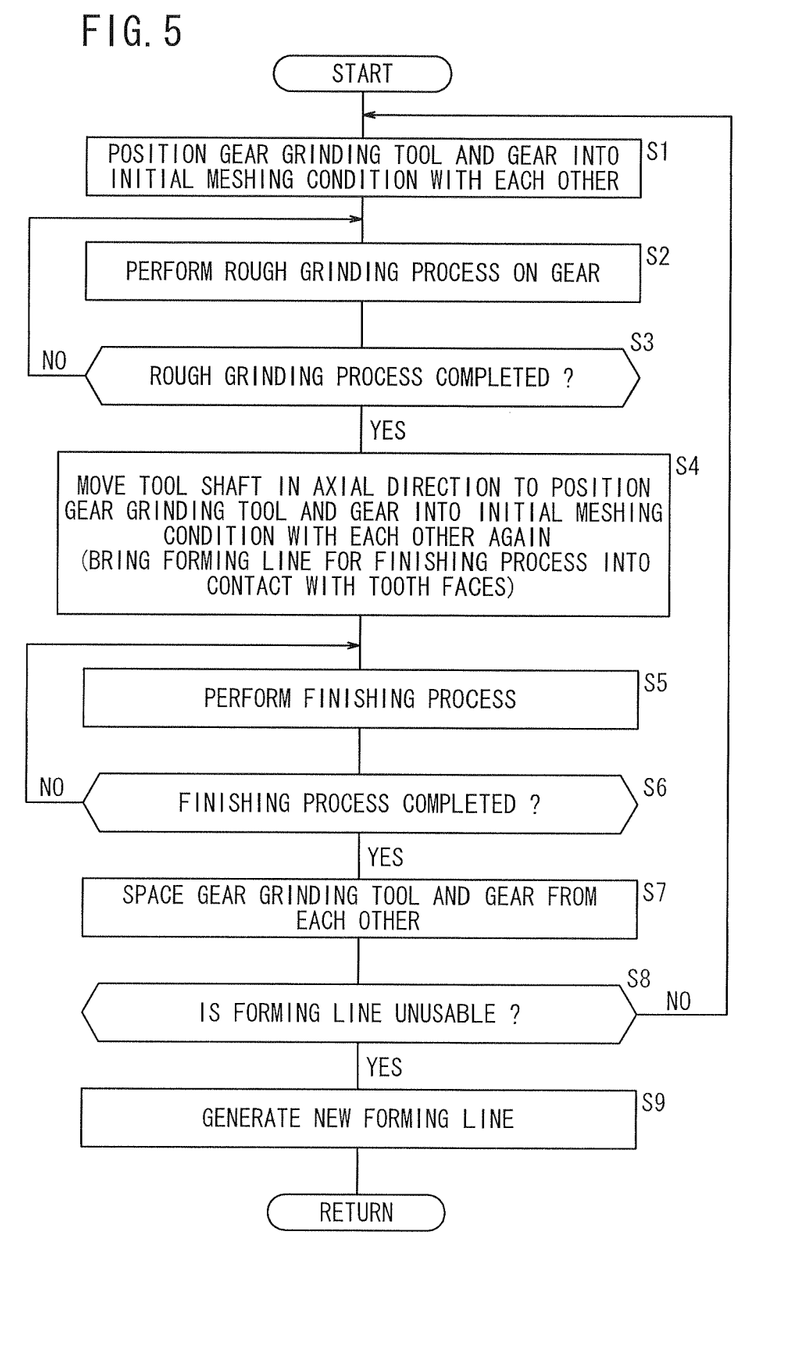
FIG. 5 is a flowchart of a gear grinding sequence performed by the gear grinding tool according to the present embodiment.

In step S1 shown in FIG. 5, the gear grinder 12 is actuated under the control of the control console 28 in order to position the gear grinding tool 10 supported on the tool shaft 22 and the gear 16 supported on the workpiece shaft 18 into an initial meshing condition with each other, i.e., into an initial phase with each other, thereby bringing the grinding faces 70 in the region R1 or the region R2 into contact with the tooth faces 16R, 16L of the gear 16. More specifically, the grinding lines 74a of the rough grinding faces 74 on the grinding faces 70 in the region R1 are brought into contact with the tooth faces 16R, 16L of the gear 16.

Figure 6:
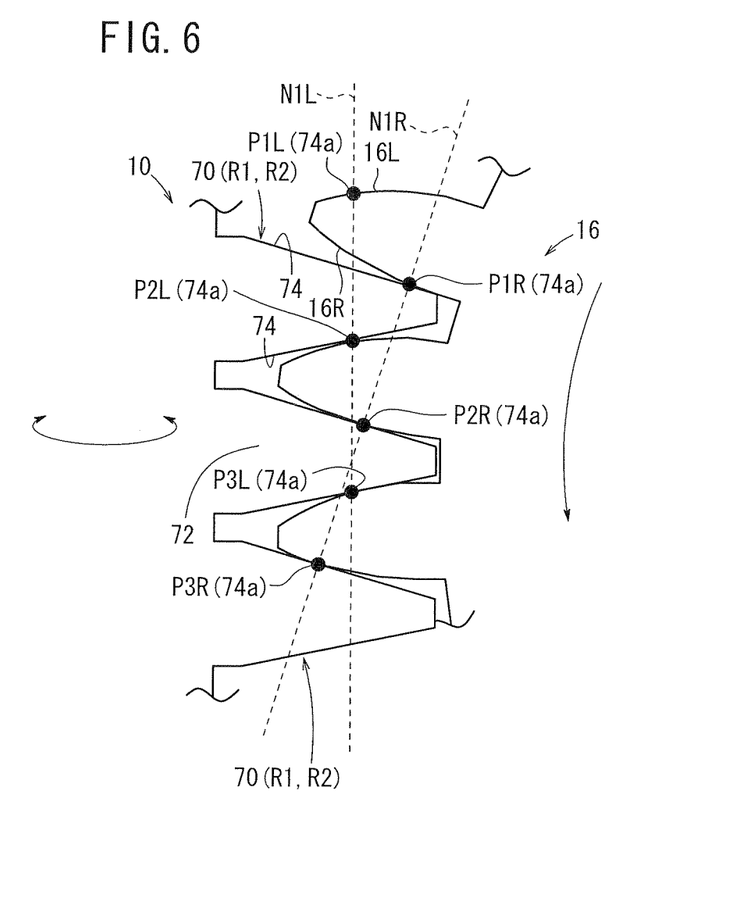
FIG. 6 is an enlarged fragmentary view showing the manner in which the gear grinding tool and the gear mesh with each other during a rough grinding process.
Figure 7:
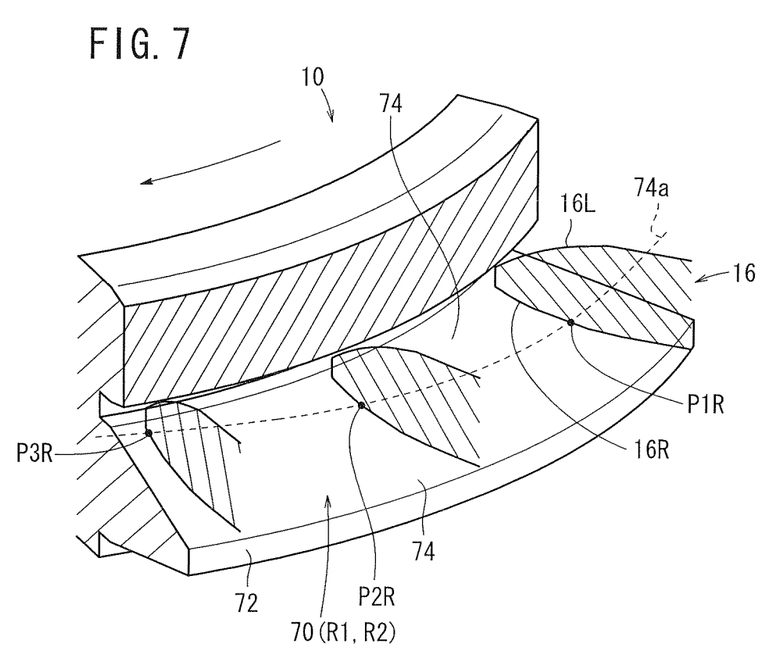
FIG. 7 is a perspective view showing the manner in which the gear grinding tool and the gear mesh with each other during the rough grinding process.

Then, in step S2, the rough grinding faces 74 perform a rough grinding process on the tooth faces 16R (16L) of the gear 16. As shown in FIGS. 6 and 7, during the rough grinding process, the rough grinding faces 74 grind the tooth faces 16R (16L) while points (acting points) P1R, P2R, P3R (P1L, P2L, P3L) of meshing contact between the grinding lines 74a of the rough grinding faces 74 and the tooth faces 16R (16L) of the gear 16 are made to move along a line (acting line) N1R (N1L) normal to the grinding lines 74a and the tooth faces 16R (16L). In FIG. 7, to facilitate understanding, the gear 16 is shown as moving along the grinding direction (helical direction) of the rough grinding face 74. However, in actual practice, the workpiece shaft 18 and the tool shaft 22 are fixed in positioned with respect to each other while the gear 16 is ground, and the gear 16 does not move along the grinding direction of the rough grinding face 74.

In step S2, the rough grinding faces 74 continuously perform the rough grinding process on the tooth faces 16R (16L) of the gear 16, until the gear 16 has made 15 revolutions while the gear 16 is moving across the teeth thereof, i.e., along the traverse directions indicated by the arrow B.

In step S3, the control console 28 determines whether the rough grinding process has been completed or not based on the number of revolutions of the gear 16. If the rough grinding process is not completed, i.e., if the gear 16 has not made 15 revolutions (NO in step S3), then the rough grinding process is continued in step S2. If the rough grinding process is completed (YES in step S3), then control proceeds to step S4.

In step S4, the gear grinding tool 10, which is supported on the tool shaft 22, and the gear 16, which is supported on the workpiece shaft 18, are spaced a suitable distance from each other under the control of the control console 28. The tool shaft 22 is moved along the axial directions, i.e., along the directions indicated by the arrow D, in order to bring the forming lines 76 on the grinding faces 71 in the region R3 into contact with the tooth faces 16R, 16L of the gear 16. In other words, the gear grinding tool 10, which is supported on the tool shaft 22, and the gear 16, which is supported on the workpiece shaft 18, are positioned in an initial meshing condition with each other again, so that the forming lines 76 for the finishing process are brought into contact with the tooth faces 16R, 16L.

As the tool shaft 22 is moved along directions indicated by the arrow D, the position detector 64 with the linear scale 66 is used to detect the position of the tool shaft 22 with respect to the directions indicated by the arrow D. Therefore, the gear grinding tool 10 and the gear 16 can be positioned again with respect to each other in the initial meshing condition with high accuracy, and the web-shaped forming lines 76 can be positioned smoothly to perform grinding in place of the rough grinding faces 74. Since the linear scale 66 detects the actual distance that the tool shaft 22 has moved, which is fed back directly to the control console 28, any errors in the various bearings used in the gear grinder 12 can be absorbed, and the gear grinding tool 10 can be moved with high accuracy.

Figure 8:
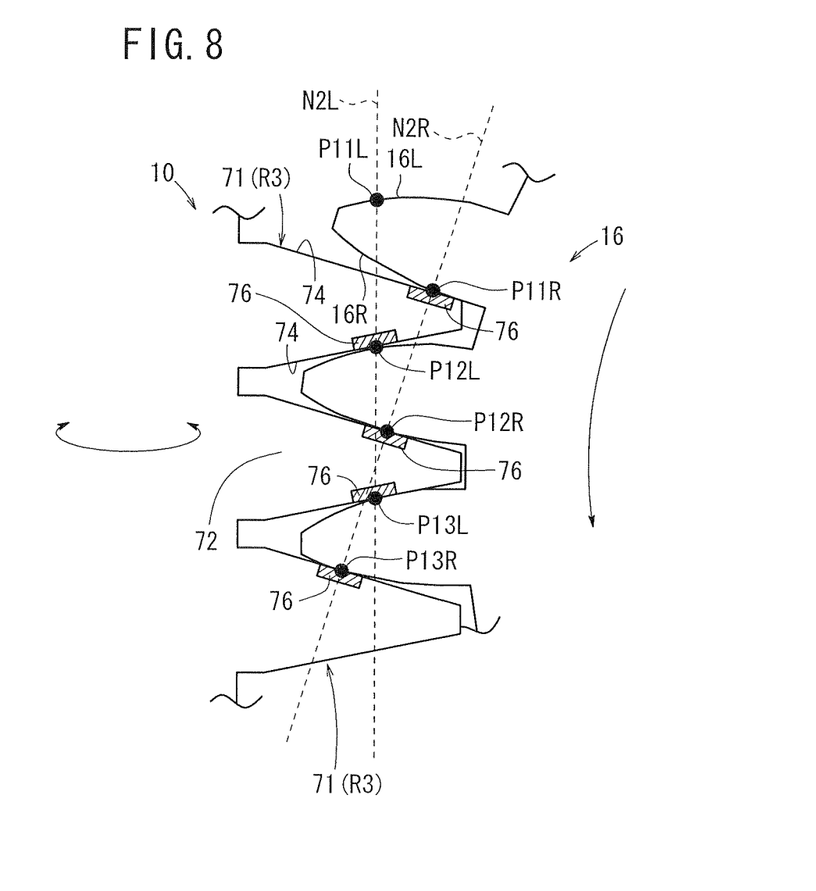
FIG. 8 is an enlarged fragmentary view showing the manner in which the gear grinding tool and the gear mesh with each other during a finishing process.

In step S5, the forming lines 76 perform a finishing process on the tooth faces 16R (16L), thereby producing a desired tooth face profile on the tooth faces 16R (16L). As shown in FIG. 8, the finishing process is similar in essential respects to the rough grinding process shown in FIG. 6. During the finishing process, the forming lines 76 grind the tooth faces 16R (16L) while points (acting points) P11R, P12R, P13R (P11L, P12L, P13L) of meshing contact between the forming lines 76 and the tooth faces 16R (16L) of the gear 16 are made to move along a line (acting line) N2R (N2L) normal to the forming lines 76 and the tooth faces 16R (16L).

In step S5, the forming lines 76 continuously perform a finishing process on the tooth faces 16R (16L) of the gear 16, until the gear 16 has made 15 revolutions while the gear 16 moves across the teeth thereof, i.e., along the traverse directions indicated by the arrow B.

In step S6, the control console 28 determines whether the finishing process has been completed or not based on the number of revolutions of the gear 16. If the finishing process is not completed, i.e., if the gear 16 has not made 15 revolutions (NO in step S6), then the finishing process is continued in step S5. If the finishing process is completed (YES in step S6), then control proceeds to step S7.

Upon completion of the finishing process, in step S7, if the gear 16 has been ground to a desired tooth face profile (YES in step S6), then the gear grinding tool 10 and the gear 16 are spaced apart from each other, and the ground gear 16 is removed from the workpiece shaft 18. If necessary, a next gear 16 to be ground is mounted on the workpiece shaft 18, and steps S1 through S7 are carried out again on the next gear 16.

The rough grinding process referred to above may be carried out in two stages, i.e., a first rough grinding process, and a second rough grinding process. For example, in the first rough grinding process, the tooth faces 16R, 16L of the gear 16 may be ground to a depth that is smaller than the depth in step S2, and in the second rough grinding process, the tooth faces 16R, 16L of the gear 16 also may be ground to a depth that is smaller than the depth in step S2. After the gear 16 has been ground in the first rough grinding process and the second rough grinding process, the gear 16 may further be ground in the finishing process. The finishing process also may be carried out in a plurality of stages.

After the gear grinding tool 10 has been used to grind a plurality of gears 16, in a test for inspecting the tooth faces 16R, 16L of ground gears 16, or in a test for inspecting the grinding faces of the gear grinding tool 10, the forming line 76 may be judged as being in an unusable state and thus not capable of finishing the tooth faces 16R, 16L. For example, the forming line 76 may be judged as being excessively worn and therefore incapable of grinding the tooth faces 16R, 16L properly. In the method of using the gear grinding tool 10 according to the present embodiment, step S7 is followed by step S8 for inspecting the forming line 76, and then by step S9 for appropriately changing the mode of usage of the gear grinding tool 10.

More specifically, the control console 28 determines in step S8 whether or not the forming line 76 is free of trouble and can be used again. If the control console 28 judges that the forming line 76 is free of trouble and can be used again (NO in step S8), then steps S1 through S7 are carried out again using the gear grinding tool 10 (first mode of usage of the gear grinding tool 10).

On the other hand, if the control console 28 judges that the forming line 76 is in an unusable state (YES in step S8), then control proceeds to step S9.

In step S9, a new forming line 76 is generated by a dresser or the like on the grinding face 70, in the region R1 (R2) that was used during the first mode of usage for performing the rough grinding process, or alternatively, on the grinding face 70 in a region R1 (R2) thereof that has not yet been used. In steps S1 through S7, upon grinding a next gear 16, the rough grinding process is performed on the next gear 16 by the rough grinding face 74 in the region R2 or R3, which was not used in step S2 during the first mode of usage, and the finishing process is performed on the next gear 16 by the new forming line 76, which is generated in step S9 (second mode of usage of the gear grinding tool 10). Thereafter, the above processes are repeated. The gear grinding tool 10 can thus be used repeatedly until the gear grinding tool 10 is unable to generate a new forming line 76. Consequently, the service life of the gear grinding tool 10 can be maximized.

As described above, the gear grinding tool 10 according to the present embodiment includes the rough grinding face 74 that extends on and along the helical tooth 72 and which includes, on at least a portion thereof, the forming line 76 for performing the finishing process. Thus, a single gear grinding tool 10 is capable of performing both the rough grinding process and the finishing process. Since the gear grinder 12 does not need to replace the gear grinding tool 10 for each of the rough grinding process and the finishing process, the time required for the gear grinder 12 to grind the gear 16 can be shortened.

When a portion of the forming line 76 on the rough grinding face 74 becomes excessively worn and is rendered unusable, the area of the rough grinding face 74 adjacent to the forming line 76 may still be used for the rough grinding process, whereas another portion of the forming line 76, which is not in an unusable state, or a newly generated forming line 76 may be used for the finishing process. Consequently, the service life of the gear grinding tool 10 can be increased. Since the forming line 76 is provided as a web on at least a portion of the rough grinding face 74, the gear grinding tool 10 is simple in structure and low in cost, and can be manufactured efficiently.

The rough grinding face 74 may be formed entirely over the helical tooth 72, whereas the region in which the forming line 76 is generated and the web width of the forming line 76 may be changed depending on grinding conditions and the shape of the gear 16 to be ground. Accordingly, the gear grinding tool 10 is highly versatile, and is low in cost.

Since the forming line 76 is in the shape of a web on the rough grinding face 74, the forming line 76 can be generated simply and at a reduced cost on the rough grinding face 74 by means of a dresser or the like.

The overall length of the gear grinding tool 10 (covering nine turns of the helical tooth 72 in the regions R1, R2, R3 in the present embodiment) is equal to or more than twice (three times in the present embodiment) the length of a portion of the gear grinding tool 10 that is used for one finishing process (i.e., covering three turns of the helical tooth 72 in the region R1 in the present embodiment), along the axial direction indicated by the arrow D. Accordingly, each of the regions R1, R2, R3 of the gear grinding tool 10 can be used in a well balanced fashion for performing both the rough grinding process and the finishing process. More specifically, when the forming line 76 on the rough grinding face 74 in one of the regions R1, R2, R3 becomes excessively worn and is rendered unusable, the rough grinding face 74 including the unusable forming line 76 may still be used for performing the rough grinding process, while a new forming line 76 may be generated on the rough grinding face 74 in another one of the regions R1, R2, R3 and used for the finishing process. Consequently, the service life of the gear grinding tool 10 can be increased.

When the helical tooth 72 (the grinding face 71), including the forming line 76 formed on the rough grinding face 74 thereof, is viewed along the axis of the gear grinding tool 10, as shown in FIG. 4B, the forming line 76 is curved in an involute shape, such that the radial position of the forming line 76 on the rough grinding face 74 with respect to the axial center of the helical tooth 72 varies gradually therealong. Such an involute forming line 76 is adequately and reliably held in contact with the tooth faces 16R, 16L of the gear 16. In addition, the rough grinding face 74 (on the grinding face 71), which lies adjacent to the forming line 76, also is adequately and reliably held in contact with the tooth faces 16R, 16L of the gear 16.

In the method of using the gear grinding tool 10 according to the present embodiment, the first mode of usage is carried out, in which the rough grinding process is performed on the gear 16 by the rough grinding face 74, and thereafter, the finishing process is performed on the gear 16 by the forming line 76. Thereafter, the second mode of usage is carried out, in which the rough grinding process is performed on the gear 16 by the rough grinding face 74 on the grinding face 71, which is juxtaposed (adjacent) with respect to the forming line 76 that has been rendered unusable by the finishing process during the first mode of usage, or by the unused rough grinding face 74, and thereafter, the finishing process is performed on the gear 16 using another forming line 76 other than the forming line 76 used during the first mode of usage. The regions R1, R2, R3 of the gear grinding tool 10 used for the rough grinding process and the finishing process can be used separately so as to increase the service life of the gear grinding tool 10.

During the second mode of usage, a new forming line 76 may be generated on the rough grinding face 74 in the region R1 (R2) used during the first mode of usage, or on the rough grinding face 74 in the region R1 (R2) that has not been used, whereupon the finishing process may be performed on the gear 16 by the newly generated forming line 76. Stated otherwise, a forming line 76 may not be generated on the rough grinding face 74 that was used during the first mode of usage, and a forming line 76 may be generated on the rough grinding face 74 to be used during the second mode of usage. In this manner, the gear grinding tool 10 and the gear 16 can easily be positioned in meshing engagement with each other for performing the first mode of usage, and a forming line 76, which is not intended for use during the rough grinding process, can be prevented from becoming unduly worn.

Figure 9:
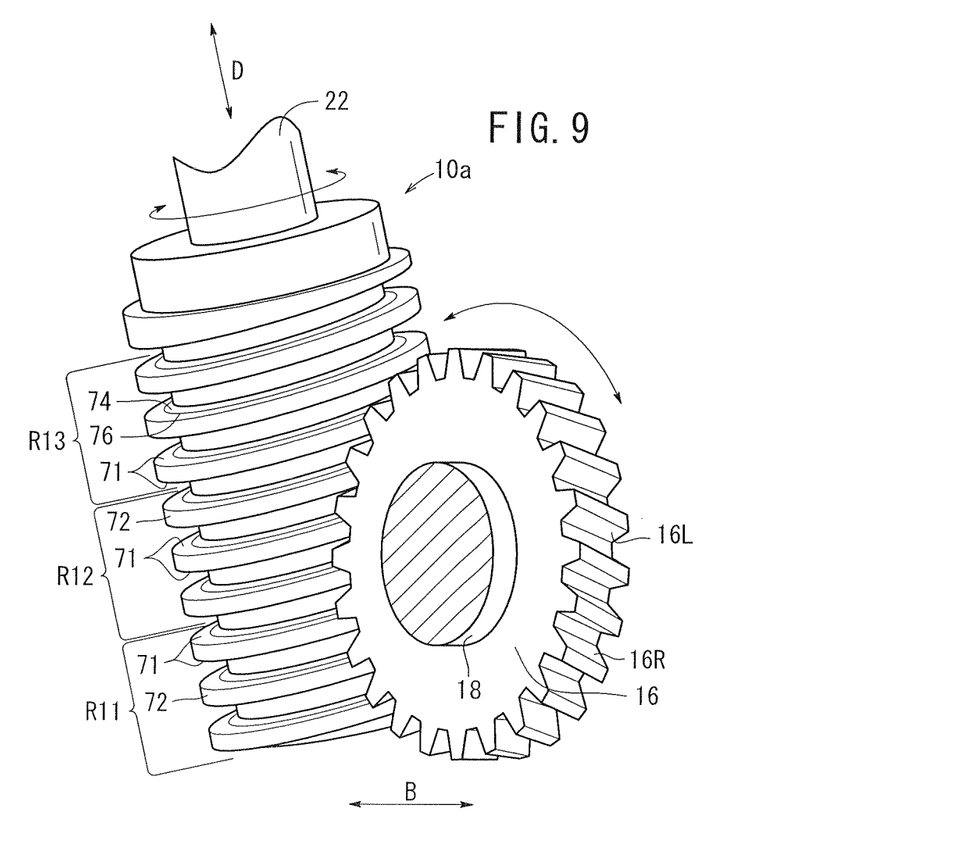
FIG. 9 is a perspective view with partial omission of a gear grinding tool according to a modified example, the gear grinding tool being held in mesh with a gear.

In the above embodiment, as shown in FIG. 3, the forming line 76 is provided only in the region R3. FIG. 9 shows a gear grinding tool 10a according to a modification of the present invention. As shown in FIG. 9, the gear grinding tool 10a includes a helical tooth 72 divided into regions R11, R12, R13, and a forming line 76 that is generated in all three of the regions R11, R12, R13. When the gear grinding tool 10a is in operation, the region R13, for example, is used for performing the finishing process during the first mode of usage. When the forming line 76 in the region R13 has become worn and is in an unusable state, then the forming line 76 in the region R11 or the region R12 may be used for performing the finishing process during the second mode of usage. Since the gear grinding tool 10a includes the rough grinding face 74 and the forming line 76 over the entire helical tooth 72, the regions R11, R12, R13 can adequately be used separately, depending on how the forming line 76 becomes worn.

The forming line 76 may be generated in advance in the regions R2, R3 shown in FIG. 3, with the region R1 being left free of the forming line 76. The gear grinding tool 10, 10a may be axially divided into two or four regions.

Although certain preferred embodiments of the present invention have been shown and described in detail, it should be understood that various changes and modifications may be made to the embodiments without departing from the scope of the invention as set forth in the appended claims.

What is claimed is:

1. A gear grinding tool having a helical tooth capable of meshing with a rotating gear to grind the gear, comprising:
    a grinding face for performing a rough grinding process on the gear, the grinding face extending on and along the helical tooth; and
    a forming line for performing a finishing process on the gear, the forming line extending on at least a portion of the grinding face,
    wherein the forming line is shaped as a web on the grinding face, and
    wherein when the helical tooth with the forming line on the grinding face is viewed along an axis of the gear grinding tool, the forming line is curved such that a radial position thereof on the grinding face varies gradually with respect to the axial center of the helical tooth.

2. The gear grinding tool according to claim 1, wherein the gear grinding tool has an overall length that is equal to or more than twice the length of a portion thereof that is used for the finishing process, along an axial direction of the gear grinding tool.

* * * * *